United States Patent
Wabschall et al.

(10) Patent No.: US 9,468,843 B2
(45) Date of Patent: Oct. 18, 2016

(54) WAGERING GAME, GAMING MACHINE, NETWORKED GAMING SYSTEM AND METHOD WITH A PLAYER SELECTION SYMBOL REPLACEMENT GAME

(71) Applicant: EVERI GAMES INC., Austin, TX (US)

(72) Inventors: Michael Jason Wabschall, Austin, TX (US); Michael Casey, Austin, TX (US)

(73) Assignee: Everi Games Inc., Austin, TX (US)

( * ) Notice: Subject to any disclaimer, the term of this patent is extended or adjusted under 35 U.S.C. 154(b) by 133 days.

(21) Appl. No.: 13/961,608

(22) Filed: Aug. 7, 2013

(65) Prior Publication Data
US 2014/0094303 A1    Apr. 3, 2014

Related U.S. Application Data

(60) Provisional application No. 61/707,836, filed on Sep. 28, 2012.

(51) Int. Cl.
| | |
|---|---|
| A63F 13/00 | (2014.01) |
| A63F 13/20 | (2014.01) |
| G07F 17/32 | (2006.01) |

(52) U.S. Cl.
CPC ........... *A63F 13/06* (2013.01); *G07F 17/3223* (2013.01); *G07F 17/3244* (2013.01); *G07F 17/3262* (2013.01)

(58) Field of Classification Search
None
See application file for complete search history.

(56) References Cited

U.S. PATENT DOCUMENTS

| | | |
|---|---|---|
| 2003/0054879 A1 | 3/2003 | Schneier et al. |
| 2006/0068873 A1* | 3/2006 | Gomez .......................... 463/16 |
| 2007/0111783 A1* | 5/2007 | Cuddy et al. ................... 463/23 |
| 2007/0155466 A1* | 7/2007 | Baerlocher et al. ............ 463/16 |
| 2009/0286586 A1* | 11/2009 | Heymann et al. .............. 463/20 |
| 2011/0300950 A1* | 12/2011 | Noda .............................. 463/46 |
| 2012/0289322 A1* | 11/2012 | Causley ......................... 463/26 |

* cited by examiner

*Primary Examiner* — Jason Yen
(74) *Attorney, Agent, or Firm* — Nathan Calvert, Esq.; Russell D. Culbertson, Esq.; JP Cody, Esq.

(57) ABSTRACT

A system, apparatus, and method are disclosed in which a gaming machine provides both a base game and a feature game which may be triggered by the base game. The feature game includes a player selectable set of symbols, where the symbols include one or more high and low value incrementing symbols and one or more terminator symbols; such that, when a player selects one of the incrementing symbols, the player's position on a ladder or other graduated sequence increments to a higher value award, all the symbols in the set are shown and then recovered and shuffled with one of the remaining high value incrementing symbols being replaced by a terminator symbol. The process iterating until the player selects a terminator symbol or achieves the jackpot (highest) award on the ladder.

14 Claims, 18 Drawing Sheets

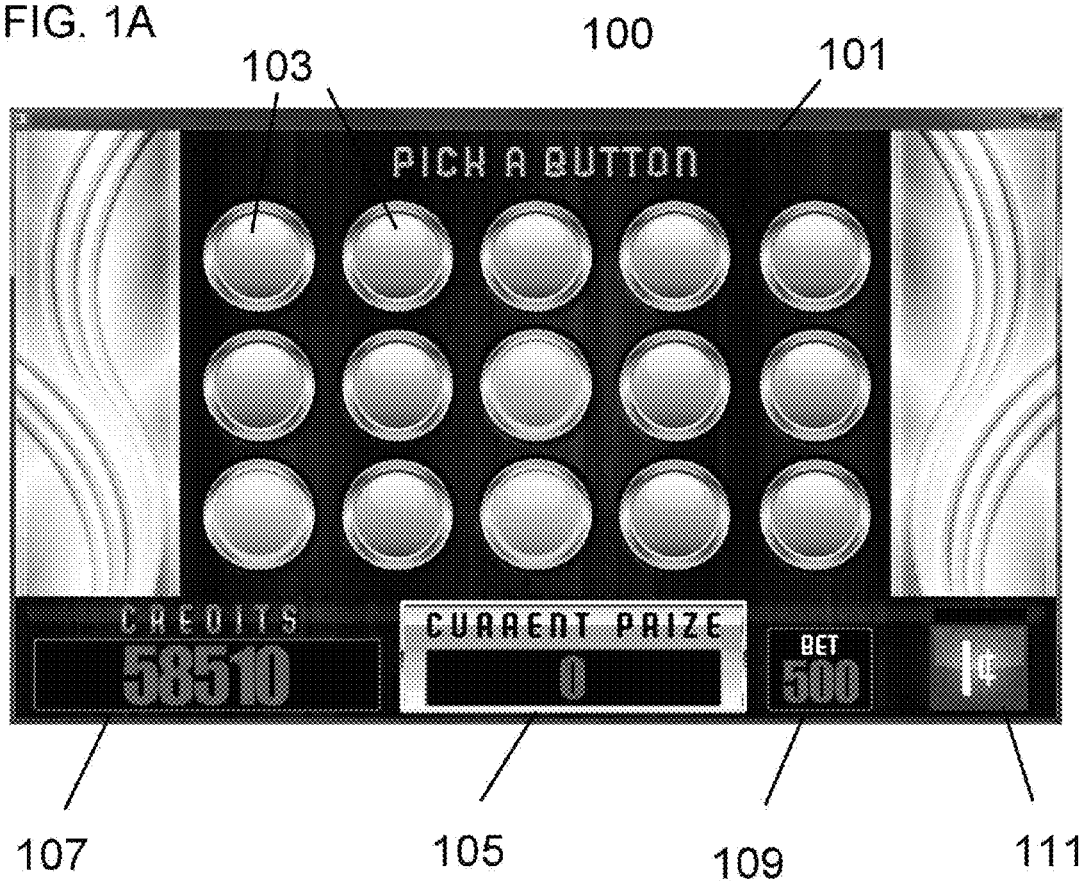

100

115

WAGERING GAME, GAMING MACHINE, NETWORKED GAMING SYSTEM AND METHOD WITH A PLAYER SELECTION SYMBOL REPLACEMENT GAME

CROSS REFERENCE TO RELATED APPLICATIONS

The Applicants claim the benefit, under 35 U.S.C. §119 (e), of U.S. Provisional Patent Application No. 61/707,836, filed Sep. 28, 2012, and entitled "WAGERING GAME, GAMING MACHINE, NETWORKED GAMING SYSTEM AND METHOD WITH A PLAYER SELECTION SYMBOL REPLACEMENT GAME." The entire content of this provisional application is incorporated herein by this reference.

COPYRIGHT NOTICE

A portion of the disclosure of this patent document contains material which is subject to copyright protection. The copyright owner has no objection to the facsimile reproduction of the patent document or the patent disclosure as it appears in the U.S. Patent and Trademark Office patent files or records, but otherwise reserves all rights of copyright whatsoever.

FIELD OF THE INVENTION

This invention relates to wagering games, gaming machines, networked gaming systems and associated methods. More particularly, the invention relates to wagering games, gaming devices, networked gaming systems, and associated methods including games with player selectable symbols.

BACKGROUND

A large number of different gaming machines have been developed to provide various formats and graphic presentations for conducting wagering games and presenting wagering game results. Various wagering games provide a bonus game round in which a player selects from an array of hidden symbols to reveal a prize or other feature in the bonus game. There continues to be a need for wagering games which maintain the player's interest and generate excitement to enhance the player's gaming experience.

SUMMARY OF THE INVENTION

The present invention includes wagering games, gaming machines, networked gaming systems and methods with a secondary game triggered by the primary game. The secondary game includes a set of player selectable symbols which include one or more high and low value incrementing symbols and one or more terminator symbols. When player selects one of the incrementing symbols, the player's position on a tiered award scale increments to a higher value award, one or more terminator symbol replace symbols in the array, if available, and the player is prompted to select again. The first selection may include no terminator symbols. The selection process is repeated until the player either achieves the highest award or selects a terminator symbol.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations.

Another version of the invention is a gaming system that includes one or more gaming servers, and a group of electronic gaming machines connected to the servers by a network. The various functionalities described herein may be distributed between the electronic gaming machines and the gaming servers in any practically functional way. For example, the current preferred architecture is for the servers to determine all aspects of game logic, random number generation, and prize awards. The gaming machines provide the functionality of interfacing with the player and animating the game's presentation of the results received from the server in an entertaining manner. However, other embodiments, of course, might use a thin client architecture in which the animation is also conducted by the server and electronic gaming machines serve merely as a terminal to receive button or touch screen inputs from the player and to display graphics received from the server. Some systems may also employ an ultra-thin architecture, in which the gaming machine does not run a full operating system, and instead only sends inputs and displays video received from the server.

These and other features of the invention will be apparent from the following description of the illustrative embodiments, considered along with the accompanying drawings.

BRIEF DESCRIPTION OF THE DRAWINGS

FIG. 1A is an example initial screenshot of a player selection feature game on a primary display in accordance with one or more embodiments of the present invention.

DESCRIPTION OF ILLUSTRATIVE EMBODIMENTS

Referring to FIGS. 1A-1H, example screenshots are shown on primary display 100 of a player selection feature game 101 (such as Multimedia Games "High-Rise Hotel Elevator" Bonus game) in accordance with one or more embodiments. Display 100 and the content of the screenshots may be conventionally controlled and driven by a game processor configured to play a base game with a triggering event that initiates the player selection feature game 101. The game processor may be part of a gaming device or remote therefrom, such as on a server communicatively connected to the gaming device. The gaming device may include one or more displays including the primary display 100 and a user interface enabling a player to place a wager and initiate the base game.

As shown in FIG. 1A, the player selection feature game 101 includes a set of selectable buttons 103, each of which may be selected to uncover a corresponding result. In the case of the initial stage of the player selection feature game 101, each of the selectable buttons may correspond to an award with none of the selectable buttons corresponding to a terminator symbol, such that when the feature game 101 is triggered, there may not be an initial award corresponding to the triggering event. In an alternative embodiment, there may be an initial award when the feature game 101 is triggered and there may be one or more terminator symbols initially corresponding to one or more of the selectable buttons. In the example case, there is no initial award and the Current Prize 105 shows '0', the player's Credits 107 are shown as '58510', the player's Bet 109 is shown as '500', and the Denomination 111 is shown as one cent. The display 100 further provides a banner prompting the player to Pick a Button.

In addition to the display of the selectable buttons in the feature game 101 on primary display 100, the game processor may simultaneously or sequentially display an artifice, such as an image showing the floors of a high rise hotel, linked to the selectable buttons (FIGS. 1I-1N), such that when a player selects a button, the value associated with the button may be used to either, increment a value associated with the artifice and the Current Prize 105 and reset the selectable buttons 103 for the player to make another selection, or, terminate the feature game 101 by awarding the value associated with the Current Prize 105. In the example, a high rise display (e.g. a display with a greater height than width) may be positioned above the primary display and be controlled as to the content displayed by the game processor. Referring to FIG. 1I, the high rise display shows the image of a high rise hotel including the various floors 151 of an elevator with increasing award levels. FIG. 1I may correspond and be shown together with FIG. 1A, such that no floors and corresponding award levels are shown illuminated.

Figure 1B:
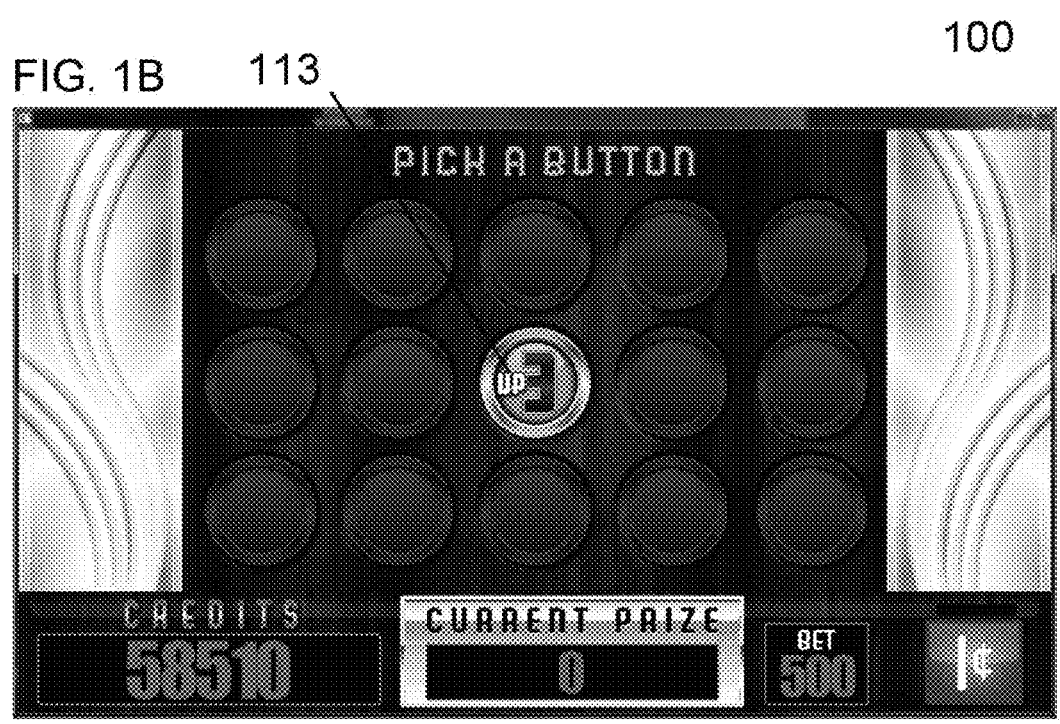
FIG. 1B is an example screenshot of a player selection feature game on a primary display following an initial player selection and uncovering a high value incrementing symbol in accordance with one or more embodiments of the present invention.
Figure 1C:
FIG. 1C is an example screenshot of a player selection feature game on a primary display revealing all the symbols and highlighting the selected high value incrementing symbol in accordance with one or more embodiments of the present invention.
Figure 1D:
FIG. 1D is an example screenshot of a player selection feature game on a primary display showing the current prize level based on the prior player selection, covering and shuffling the symbols, adding a terminator symbol to replace one of the high value symbols, and prompting the player to select another symbol in accordance with one or more embodiments of the present invention.

As shown in FIG. 1B, once a player selects a button, the game processor reveals the corresponding value 113 on display 100, which in the example is an 'Up 3 Floors' award and is one of the high value awards in the feature game 101. The game processor thereafter reveals the values associated with each of the buttons 103 as shown in FIG. 1C. Corresponding to the award, the game processor increments the floor level of the elevator a corresponding amount and illuminates the resulting floor level and award, FIG. 1J. In the example, the third floor level is illuminated together with the associated award. The game processor also may cause the primary display 100 to display the Current Prize 105 as award amount associated with the current elevator level which in the example is '5000', replace one or more of the high value awards associated with the buttons 103 with terminator values (Collect), hide the awards and shuffle the buttons 103, and then enable the player to select another button (FIG. 1D—notice the Current Prize field has been updated). The determination by the processor to replace one or more of the high value awards may be through the use of a random number generator. For example, the default may be to replace one high value award with a terminator, but through the use of an RNG or similar mechanic there may, by example, be a 36% chance programmed for the processor to determine whether to replace a second high value award with a terminator, a 15% chance programmed for the processor to determine whether to replace a third high value award with a terminator, etc. In one or more embodiments, the symbol (button) replaced may be a symbol other than the one selected. In some embodiments, the symbol (button) replaced may not be based on the value of the symbol (or the award associated therewith).

Figure 1E:
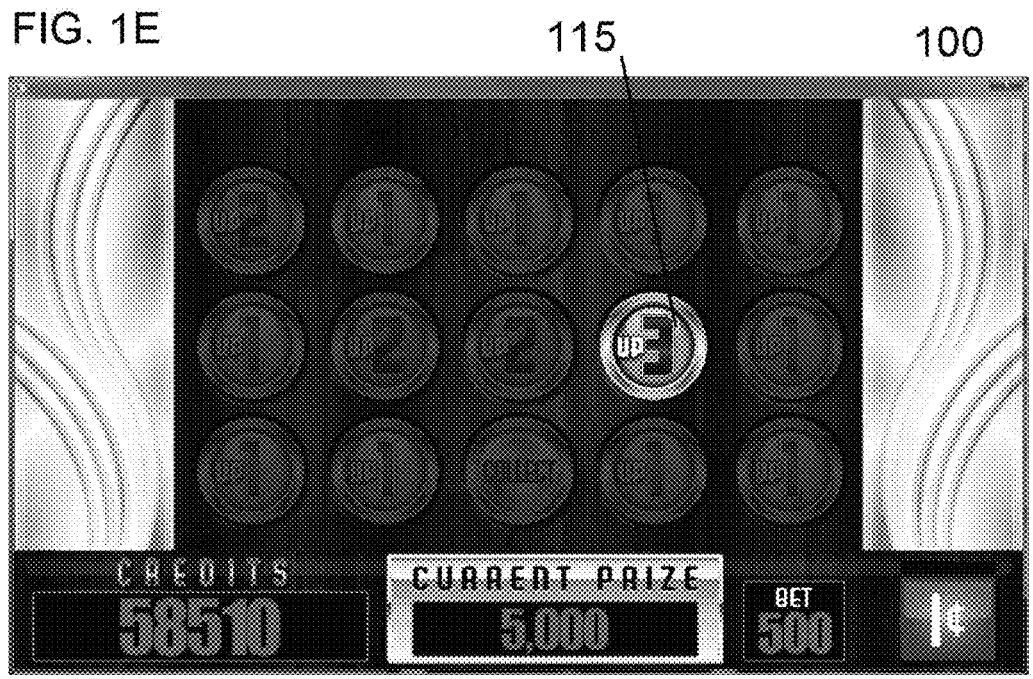
FIG. 1E is an example screenshot of a player selection feature game on a primary display showing the current prize level based on the prior player selection, revealing all the symbols and highlighting a second selected high value incrementing symbol in accordance with one or more embodiments of the present invention.
Figure 1F:
FIG. 1F is an example screenshot of a player selection feature game on a primary display showing the current prize level based on the prior player selection, revealing all the symbols and highlighting a third selected high value incrementing symbol in accordance with one or more embodiments of the present invention.

Referring to FIG. 1E and repeating the process, after the player selects another button, the game processor reveals the corresponding value 115 on display 100, which in the example is an 'Up 3 Floors' award and is the last remaining highest value award in the feature game 101, and then reveals all the unselected values. Corresponding to the award, the game processor increments the floor level of the elevator a corresponding amount and illuminates the resulting floor level and award, FIG. 1K. In the example, the sixth floor level is illuminated together with the associated award. The Current Prize is modified to reflect the updated award level, which in the example is '15000' (FIG. 1F). Again, one or more values associated with the buttons are replaced by one or more terminators, the values are hidden, the buttons are shuffled, and the player is prompted to select again.

Figure 1G:
FIG. 1G is an example screenshot of a player selection feature game on a primary display showing the current prize level based on the prior player selection and showing a fourth selected high value incrementing symbol in accordance with one or more embodiments of the present invention.

Referring to FIG. 1F, again repeating the process, after the player selects another button, the game processor reveals the corresponding value 115 on display 100, which in the example is an 'Up 2 Floors' award and is one of the highest remaining value awards in the feature game 101, and then reveals all the unselected values. Corresponding to the award, the game processor increments the floor level of the elevator a corresponding amount and illuminates the resulting floor level and award, FIG. 1L. In the example, the eighth floor level is illuminated together with the associated award. The Current Prize is modified to reflect the updated award level, which in the example is '25000' (FIG. 1G). Again, one or more values associated with the buttons are replaced by one or more terminators, the values are hidden, the buttons are shuffled, and the player is prompted to select again.

Figure 1H:
FIG. 1H is an example screenshot of a player selection feature game on a primary display showing the current prize level based on the current player selection, revealing all the symbols and highlighting the fourth selected high value incrementing symbol in accordance with one or more embodiments of the present invention.
Figure 1I:
FIG. 1I is an example initial screenshot of a prize elevator on a high-rise display operable together with the player selection feature game in accordance with one or more embodiments of the present invention.
Figure 1J:
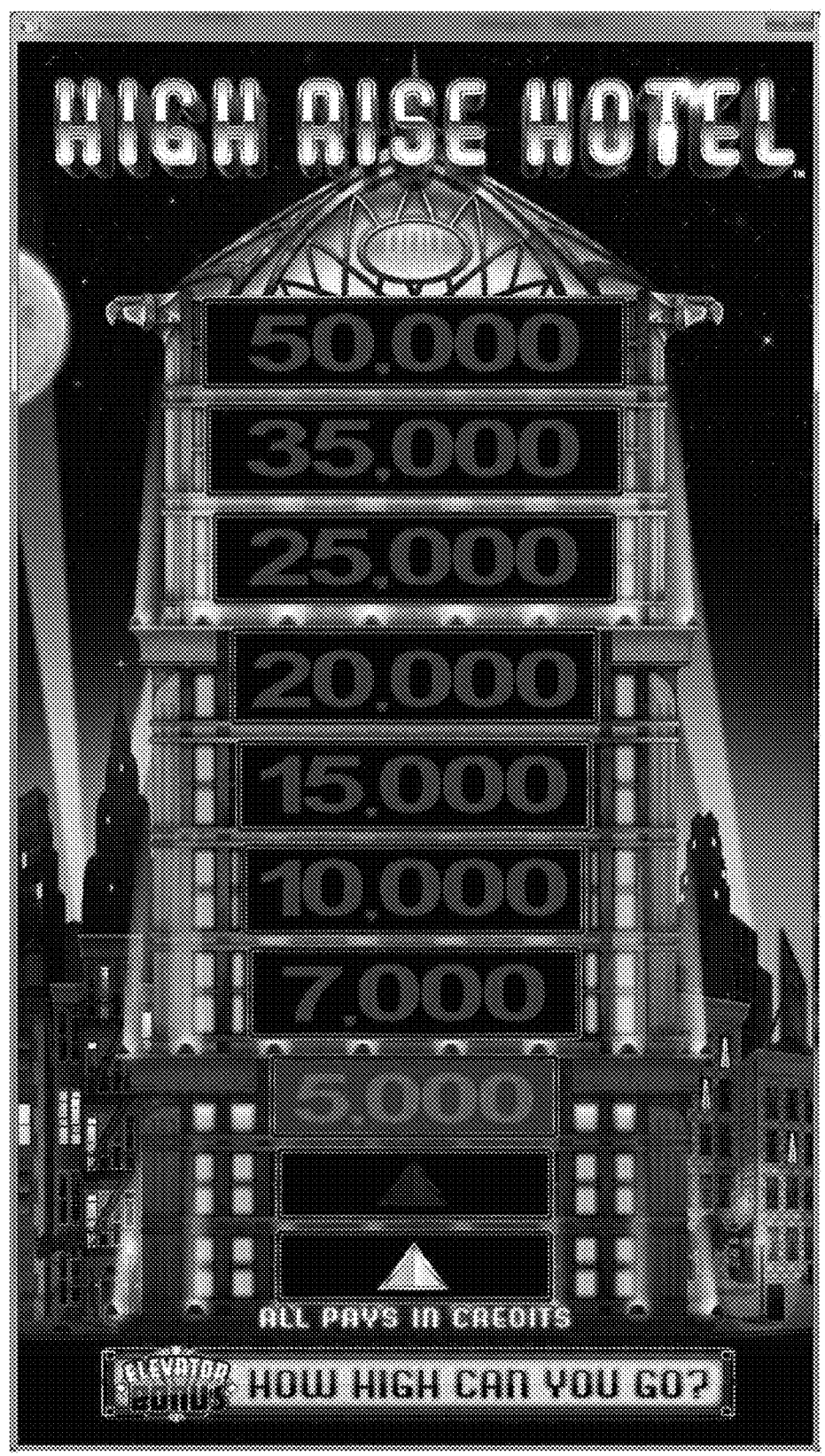
FIG. 1J is an example screenshot of a prize elevator on a high-rise display operable together with the player selection feature game following an initial player selection uncovering a three floors incrementing symbol in accordance with one or more embodiments of the present invention.
Figure 1K:
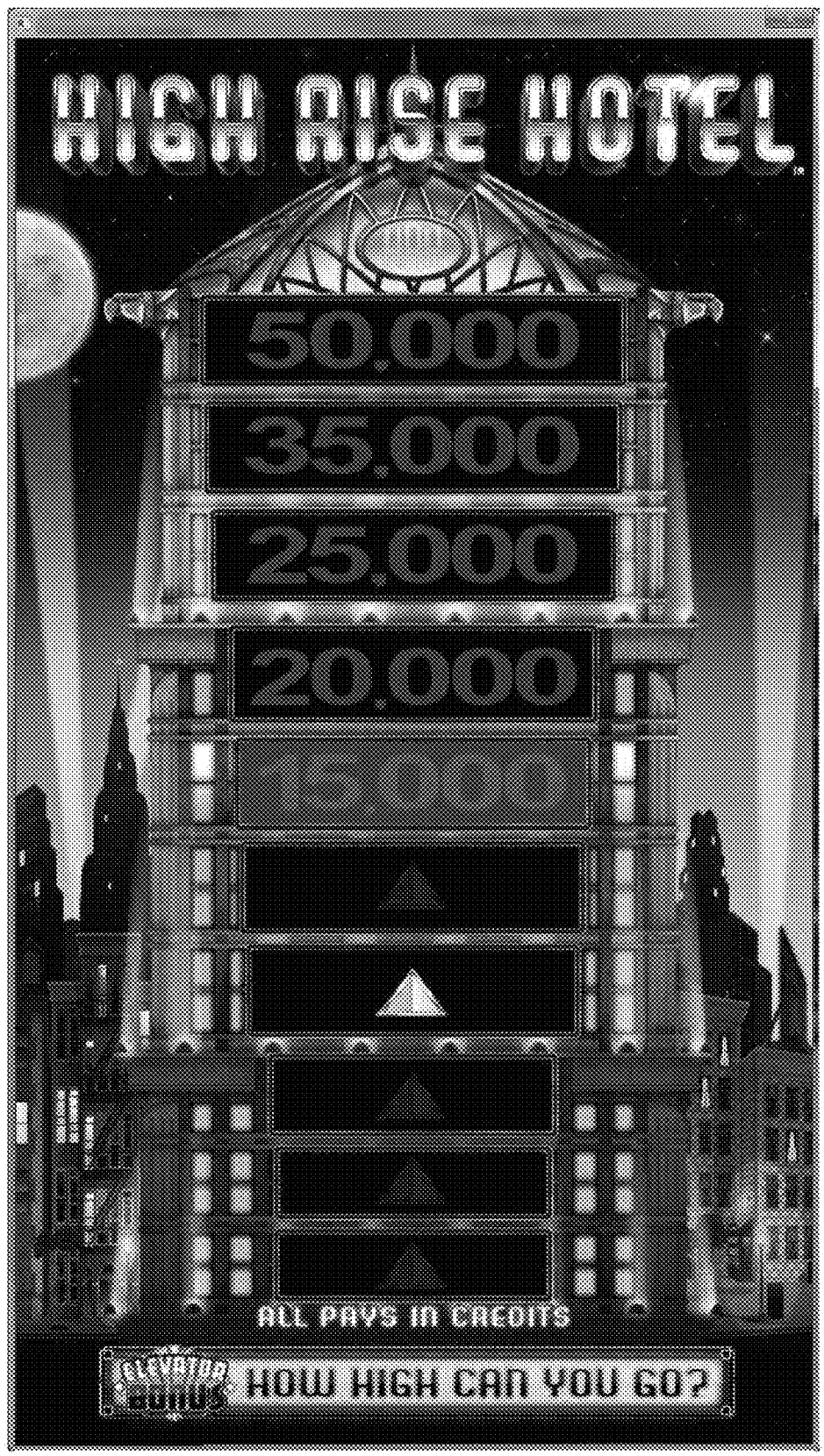
FIG. 1K is an example screenshot of a prize elevator on a high-rise display operable together with the player selection feature game following a second player selection uncovering a three floors incrementing symbol in accordance with one or more embodiments of the present invention.
Figure 1L:
FIG. 1L is an example screenshot of a prize elevator on a high-rise display operable together with the player selection feature game following a third player selection uncovering a two floors incrementing symbol in accordance with one or more embodiments of the present invention.
Figure 1M:
FIG. 1M is an example screenshot of a prize elevator on a high-rise display operable together with the player selection feature game following a fourth player selection uncovering a two floors incrementing symbol to achieve the highest floor in accordance with one or more embodiments of the present invention.
Figure 1N:
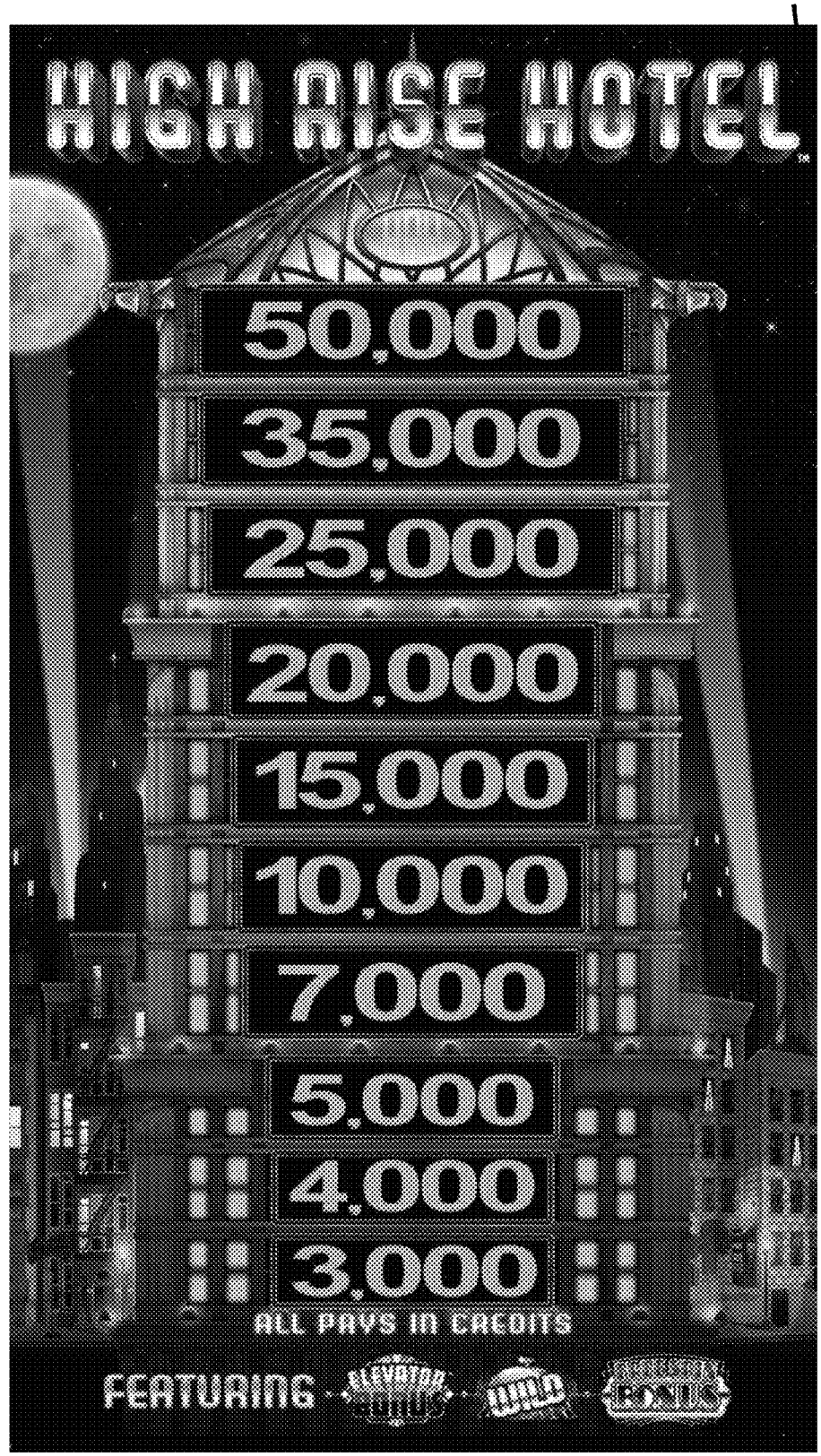
FIG. 1N is a screenshot of an example attract mode screen showing a prize elevator on a hi-rise display operable together with the player selection feature game in accordance with one or more embodiments of the present invention.

Referring to FIG. 1G, again repeating the process, after the player selects another button, the game processor reveals the corresponding value 115 on display 100, which in the example is an 'Up 2 Floors' award and is one of the highest remaining value awards in the feature game 101, and then reveals all the unselected values (FIG. 1H). Corresponding to the award, the game processor increments the floor level of the elevator a corresponding amount and illuminates the resulting floor level and award, FIG. 1M. In the example, the tenth floor level is illuminated together with the associated award. The Current Prize is modified to reflect the updated award level, which in the example, is '50000' and the top prize. The processor increments the player's credit meter with the '50000' award, concludes the feature game 101 presentation, re-displays the high rise display 150 in attract mode (FIG. 1N), and re-displays the base game on the primary display 100 for further wagers and play by the player. In one or more embodiments, the highest award may be a progressive award.

Referring generally to the figures, display device 100 may be a conventional video display device (for example, a landscape mode display with a 9×6 aspect ratio) with a touch-sensitive user interface. Example implementations may include dedicated gaming machines (e.g. a Multimedia Games™ wide body 23" video display cabinet), networked tablet computers (e.g. Apple iPad), networked personal computers, etc. on which the base game and feature game 101 may be respectively displayed. The games may be displayed under the control of a local or remote game processor configured to execute coding responsive to player inputs (e.g. wager and game play requests). Also, in one or more embodiments, display device 100 may be used to display both aspects of the feature game, such as a side-by-side display of the selectable buttons and the high rise hotel. In another alternative, the feature game may entirely be displayed on high rise display 150. For example, the selectable buttons may be displayed in a lower portion of the high rise display easily accessible by the player and the high rise hotel may be displayed above the selectable buttons.

Figure 2A:
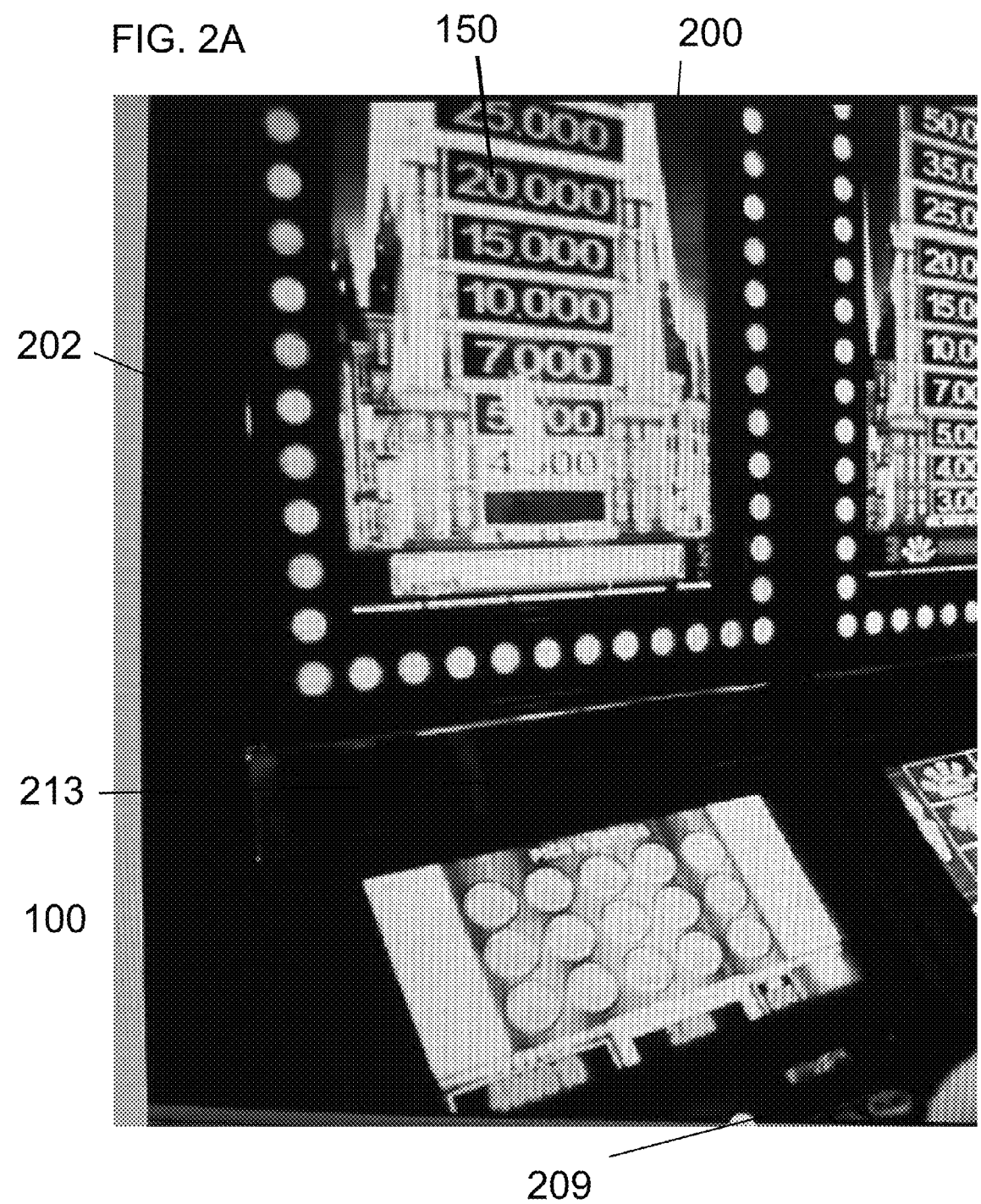
FIG. 2A is a front perspective view of an example upright gaming machine according to one or more embodiments.
Figure 2B:
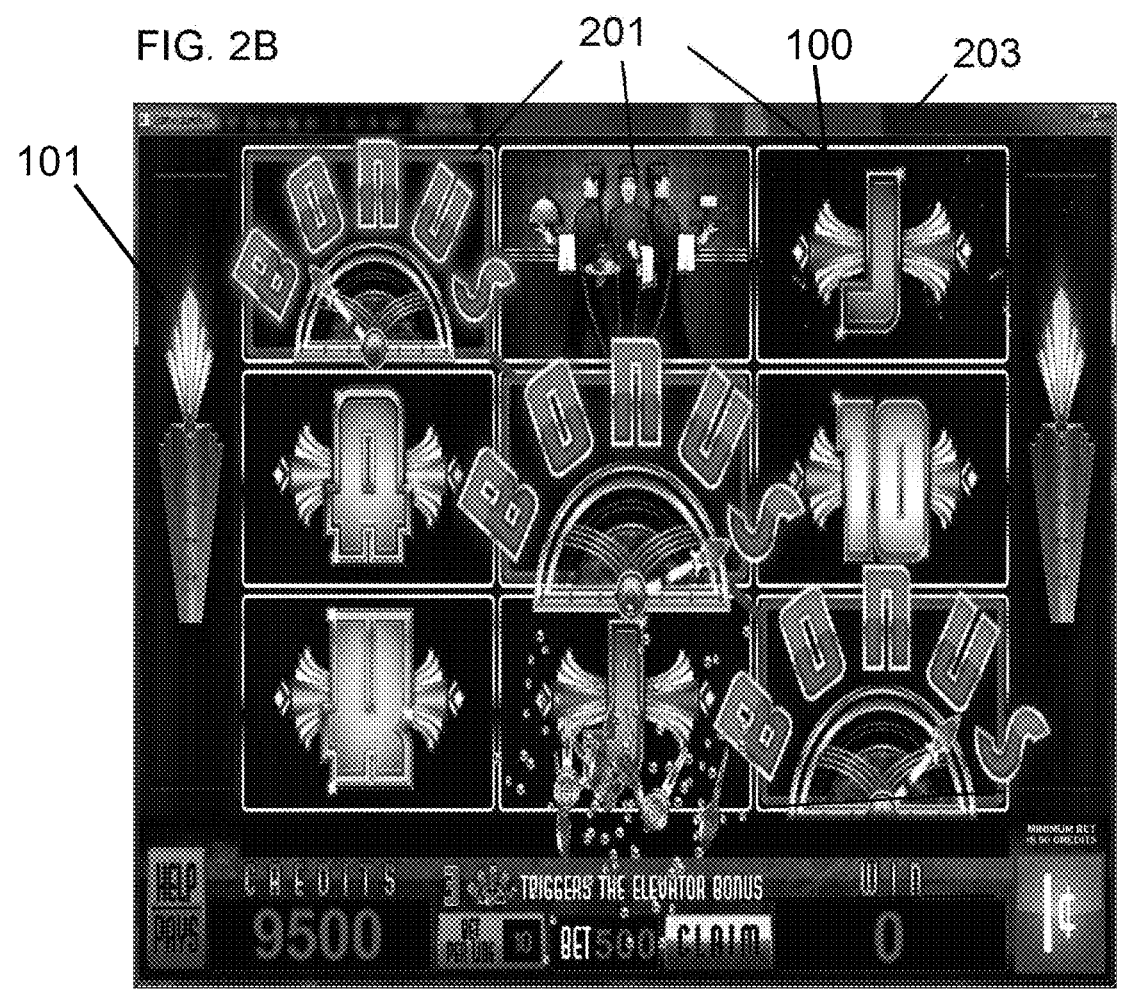
FIG. 2B is an example screenshot of a base game triggering event initiating the elevator bonus game (player selection feature game) in accordance with one or more embodiments of the present invention.

Referring to FIGS. 2A and 2B, gaming machine 200, such as Multimedia Games® High Rise Hotel™ M11 Video gaming machine, is shown including primary display device 100 on which a set of reels 201 (e.g., a set of nine single symbol reels) are shown or displayed in a base game display area 203 and a high rise display 150 on which at least a portion of the feature game (e.g. a set of floors with corresponding awards in a high rise hotel elevator themed image) is shown in accordance with one or more embodiments. Primary display device 100 and the other components of gaming machine 200 are all mounted on or about a cabinet 202. During primary game operation or attract mode, a base game paytable may be displayed on display 100 (or another available display) by accessing the help screen to view various base game winning outcomes associated with various awards and additional information regarding game play including criteria or requirements to activate and/or play the feature game 101. For example, the feature game 101 may be triggered by the display of three 'Bonus' symbols as shown in FIG. 2B.

Gaming machine 200 is also shown to include middle display 213 which may display a server-based game (such as bingo, in the case of a Class II gaming machine), advertising or other content as may be provided over a network or through the gaming machine. Gaming machine 200 further includes user interface 209 with which a patron may place wagers and initiate play of one or more games at gaming machine 200. User interface 209 may include: a commercially available player tracking interface unit, such as a Bally iView™ unit, a button deck including buttons for selecting paylines and wagers per payline in the base game shown in base game area 203, and a "Play" button and/or handle with which the player may initiate play of the games selected by the player. The button deck may be provided on a touch panel (such as on the lower portion of display device 100) in addition to or in the alternative to a physical button deck. The player tracking unit may include a card reader, a bill acceptor/printer, and player display which may display a greeting to the player, player points, a menu for communicating with player tracking server, and other casino operator content.

While gaming machine 200 is shown as a quasi-slant top cabinet style with a high rise display, various cabinet styles or device types may be utilized including an upright cabinet style, a bar top cabinet style (where the cabinet may be part of a bar/table top and/or housed therein), a personal computer, or, a tablet, cell phone or other handheld device.

In the reel game shown in FIG. 2B, each reel 201 displays a single symbol viewable on display device 100 (e.g. through a glass window or transparent display, in the case of mechanical reels, or, as displayed in a video format). With the reels in a stationary position, the symbols visible on display device 100 represent an array of symbols through which various paylines may be defined. The reels may be of different styles, such as three, four, five or more reels side-by-side, displaying one or more symbols column-wise.

During a wagering game (as may be initiated by a player by placing a wager and pressing a "Play" button), the reels may be simulated to spin (or electro-mechanically spun in the case of mechanical reels) about an axle under the control of a game processor which randomly or pseudo-randomly determines the game outcome and causes the reels to stop in accordance with the determined game outcome. Alternatively, a game processor may randomly or pseudo-randomly stop the reels and then evaluate the displayed symbols in light of the applicable paytable to identify the reel-type game outcome.

One or more paylines, combinations, or patterns of the symbols including those visible in display 100 may be correlated to a game result payable in accordance with a paytable such as may be displayed with respect to the base game shown in base game display area 203. For example, a game with five reels and displaying four symbol locations per reel may have four paylines which extend horizontally across each reel and many others which may zig and zag across the various reel symbol locations both on and off the viewable display area. A patron may wager on one or more of the paylines during each game play. Display device 100 may thereby be used to display game results to one or more patrons who may view gaming machine 200, and the game processor may make payment to the patron by incrementing a credit meter for winning outcomes of paylines in accordance with the paytable and the player's wager. A player may also be provided the option to bet one, two, three, or more credits on each payline when playing the base game. While example feature game 101 includes a set of nine reels 201, various numbers of reels and paylines may be selected or utilized in an implementation of one or more embodiments, such as one, two, three, four, five, six, or seven reels, and so forth.

Primary display device 100 may comprise a single display device or may comprise two or more display devices (for example, two flat panel display devices in over- or underlaying relation to each other, or in a side-by-side arrangement). In some implementations, primary display device 100 may comprise a touch-sensitive display panel, such as a flat panel LCD or LED display, which may be programmed to display an opaque or thematic frame image (which may include video and/or still images), except over a reel display area. Primary display device 100 may be programmed to be transparent or translucent during game play of the primary wagering game, so that the patron may view the game presentation in the reel display area where a set of mechanical reels may be viewable or a set of video reels may be displayed by an underlying display. Then, when the feature game is triggered, the feature game may be displayed on the overlaying display and have an opaque background covering the view of the primary reel display. In addition, the entire display surface of primary display device 100 (or a portion thereof) may be configured to respond to the patron's touch such as to select paylines, select credits wagered per payline, and/or play the base game.

In one or more alternative embodiments, primary display device 100 may be programmed to display a bonus or feature game (such as the pick-type, player interactive bonus game shown in FIGS. 1A-1G) that may be triggered by the appearance of one or more special symbols or other random event. For example, when a bonus or feature game is triggered, primary display device 100 (or a portion thereof) may be transformed to display content associated with the bonus or feature game and once the bonus or feature game is complete, primary display device 100 may revert to the primary game display state. In the player pick-type bonus game shown in FIGS. 1 A-1N, a touch sensitive portion of display device 100 may be programmed to display player interactive elements such as, for example, a selection of buttons to enable player interactivity with the game. In particular, a player may use such a touch screen portion to select the button or item in order to cause the game to perform additional steps and/or provide one or more bonus or feature game outcomes and awards to the player.

In one or more alternative embodiments, gaming machine 200 may include mechanical reels with fixed or dynamic symbols. Conventionally, mechanical reels include reel strips with fixed symbols. However, reel strips may be implemented using FOLED (flexible organic LED), for example, or comparable reel strips wherein one or more symbols may be programmed dynamically to vary the symbol and/or its appearance, either from one fixed image to another (such as changing a symbol to a wild symbol or changing a series of symbols to wild symbols), or, from a fixed image to a dynamic (e.g. animated or video) image or a set of miniature video reels. In various instances when a symbol changes to another symbol, a bonus or enhanced award may be paid in accordance with the paytable, or a bonus (a fixed or progressive amount) may be paid separate from the paytable.

In the event that the payment is progressive, a progressive pool may be generated from an operator's marketing dollars or from play at one or more gaming machines which may be eligible for the progressive award. The progressive pool may be maintained by a progressive server (such as server 407 shown in FIG. 4). In cases when a progressive prize is associated with an individual gaming device, the progressive pool may be maintained through a processor (such as the game processor) associated with the gaming device. In cases when the progressive prize associated with a game is personal to the player, the amount of the progressive award may be maintained by a processor associated with the game while the player is playing the particular device, and when the player's gaming session ends, the amount accumulated towards the personal progressive award, if not won, may be forwarded to a server, such as player account server 409 in FIG. 4, which may forward the information to a subsequent device when the player returns to play or selects another gaming machine on which to play. By example, in the feature game 101, one or more awards associated with the elevator floors may be progressive awards.

Another conventional game display approach is to implement reels virtually (video reels) on a display, such as primary display device 100 as shown in the figures discussed herein. In the case of virtual displays of the reels, the symbols may be fixed or animated on each of the reels. In one or more embodiments, the appearance of one or more special symbols in the base game shown in base game display area 203 may trigger the feature game 101.

In one or more alternative embodiments, overlapping display panels may be implemented to generate video or display effects over the primary game reels. For example, the reel display area may be implemented as a transmissive (e.g. Aruze or WMS transmissive display panels) display or a transparent (e.g. Bally transparent display panels) display configured to display visual effects together (or cooperatively) with the primary reels under the control of the game processor during the operation of a wagering game. In the case of virtual reels, the virtual reels may be recessed a distance from an overlaying display and segregated by dividers similar to dividers separating mechanical reels, which may provide a spatial characteristic (e.g. IGT Pure-Depth® display panels). In either case, the overlapping display may be touch sensitive and configured to interact with the player by transmitting and receiving signals as described above.

In one or more embodiments, the game processor operating the wagering game and interacting with various peripheral components in many instances is implemented as a microprocessor, such as an Intel Pentium® or Core® microprocessor, on a printed circuit board including one or more memory devices positioned within gaming machine 200. In alternative implementations, the game processor may be remote from gaming machine 200, such as on a server network (game server 403 shown in FIG. 4 for example) connected to gaming machine 200, in which case the game operation as described herein may be accomplished through network communications to control the display of the game on gaming machine 200.

Figure 3:
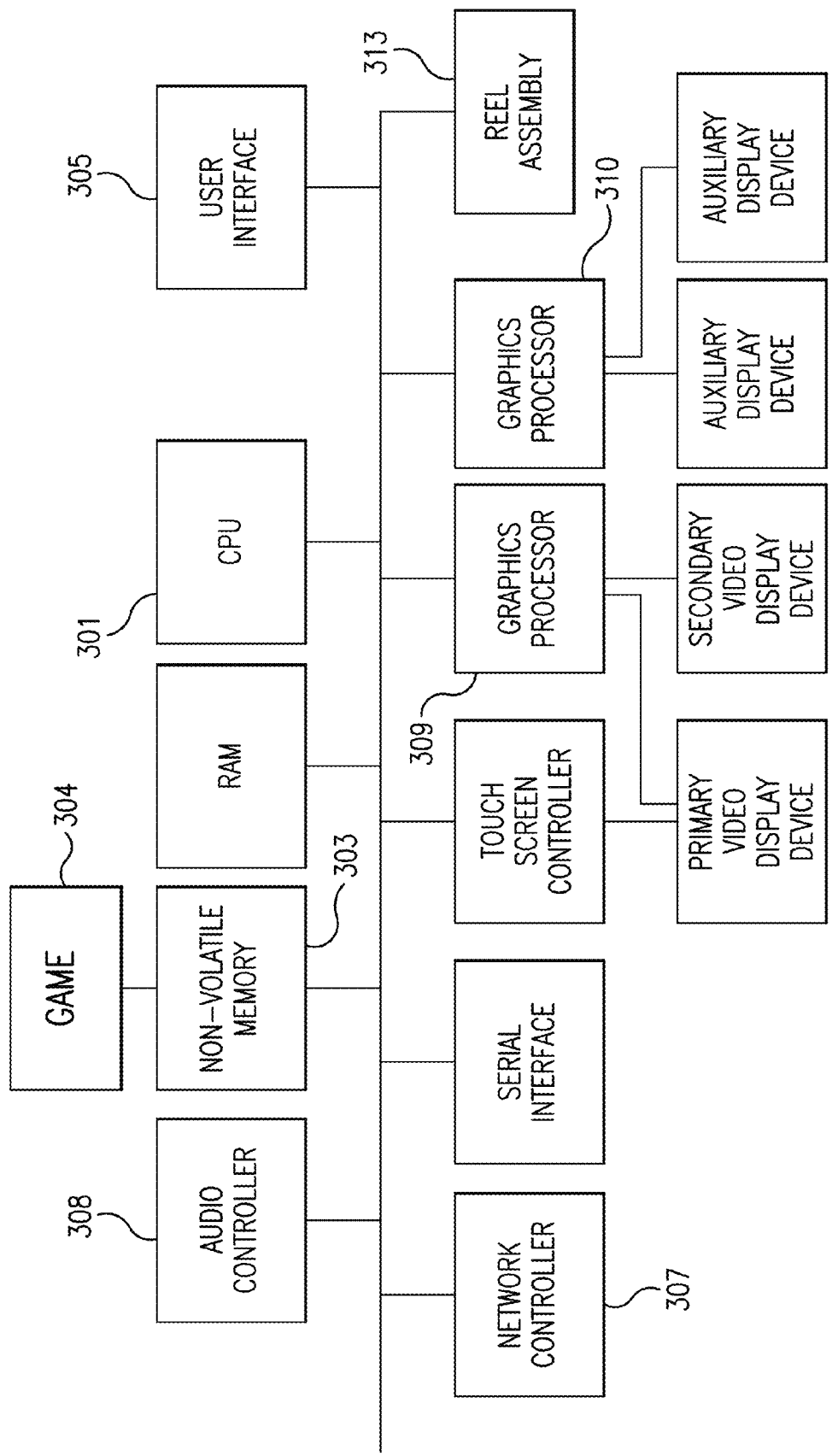
FIG. 3 is an example logic diagram of a gaming machine in accordance with one or more embodiments.

FIG. 3 shows an example logical diagram of gaming machine 200 and includes a CPU or game processor 301, memory 303 with wagering game 304, user interface 305, network controller 307, audio controller 308, graphics processors 309 and 310, and reel assembly 313. The reel assembly 313 will be included in gaming machine 200 if the gaming machine employs mechanical reels rather than or in addition to video-generated reels. Game processor 301 in this example implementation may comprise a conventional microprocessor, such as an Intel Pentium® or Core® microprocessor, mounted on a printed circuit board with supporting ports, drivers, memory, and coding to communicate with and control gaming machine operations, such as through the execution of coding stored in memory 303 including one or more wagering games 304. Game processor 301 connects to user interface 305 such that a player may enter input information and game processor 301 may respond according to its programming, such as to apply a wager and initiate execution of a game.

Game processor 301 also may connect through network controller 307 to a gaming network, such as example casino server network 400 which will be described below in connection with FIG. 4. Through its network connection, gaming machine 200 may be monitored by an operator through one or more servers such as to assure proper operation, and, data and information may be shared between gaming machine 200 and the respective server in the network such as to accumulate or provide player promotional value, to provide server-based games, or to pay server-based awards.

Generally, activity at gaming machine 200 is initiated by a player inserting currency and/or a player card into an appropriate receiving device such as a bill acceptor for currency and card reader for the player card. Upon insertion, a signal is sent to game processor 301. In the case of the insertion of a player card, the card reader transmits card information which is directed through network controller 307 to a player tracking server connected to the network in which the gaming machine is included. Player data is transmitted to gaming machine 200 and, responsive to the data, game processor 301 may execute coding causing player data and a display command to be transmitted to one of the graphics processors 309 or 310 instructing the graphics processors to cause player information to be displayed on a respective display. Game processor 301 may also transmit commands to audio controller 308 to direct the controller to cause an audio greeting to be produced through one or more speakers associated with the gaming machine. Concurrently, the bill acceptor sends a signal to game processor 301 which may include an identification of the currency that has been read, and game processor 301 in accordance with its coding may convert the currency amount to credits and transmit a store and display signal to a credit meter and its associated display ("Credits", in FIG. 1 for example). Once credits have been associated with the credit meter, the player may select the number of paylines and credits per line that the player wishes to wager, whereupon game processor 301, in accordance with its program code, receives the wager information from user interface 305, transmits accounting and display information to the payline ("Lines"), credits per payline ("Bet per Line"), and total bet ("Total Bet") meters and displays of the gaming machine, transmits an update to the credit meter and display ("Credits") deducting the amount of the total bet, and initiates the wagering game.

In the case of a Class III gaming devices, when a game is initiated, a random number generator (RNG) may be operated by game processor 301 to determine the game outcome (either directly or by randomly selecting reel stop positions and evaluating those positions to identify an outcome). Commonly, game processor 301 is positioned within gaming machine 200 and configured to manage the operation of the gaming machine components, such as shown in FIG. 3. However, the game processor may be either onboard or external to a gaming device played by a player, such as an electronic tablet (e.g. Apple iPad® or gaming specific tablet), personal data assistant (PDA), cellular telephone (e.g. Blackberry® or Apple iPhone®), surface table (e.g. Microsoft®/IGT® touch sensitive gaming surface table), etc. In such case, when the player places a wager and initiates play of the game through user interface 305 of the gaming device, the game processor may be onboard the device or remotely located such as within a network gaming server. In the latter case, an onboard microprocessor, controller, or digital signal processor may execute coding to transmit the wager and game request information through the network, and the remote game processor may operate an RNG to determine the game outcome.

In the case of Class II gaming devices, the overall structure of the various devices as discussed above is essentially the same with the major difference being the method of determining the game outcome. Commonly, Class II gaming devices utilize the game of bingo as the basis for determining a winning outcome where the ball draw is performed remotely by a network or central determination server (alternative games may be used for determining game outcomes, such as through a lottery drawing of a finite set of numbers, if permitted by the licensing jurisdiction). Class II gaming systems are commonly referred to a central determination systems wherein pools and sub-pools of game outcomes are determined by a central server (or gaming device) and distributed amongst a set of networked gaming devices. The distribution step may be on demand, such as when a gaming device receives a game play request, or sets of game outcomes may be distributed to the various networked gaming devices in which case the game processor of the requesting gaming device may select a game outcome from the set of game outcomes, such as by using an RNG or other selection process.

Additionally, Class II gaming devices, such as a bingo-based gaming device may have multiple displays, such as are shown in FIG. 2 wherein one of the displays, such as display 213 in FIG. 2, may be used to display one or more electronic bingo cards and one or more ball drawings after a game has been initiated in accordance with the game outcome that has been provided to the gaming device by a central determination server. In the case, as in FIG. 2, where the primary display comprises a set of reels, game processor 301 converts the centrally-determined game outcome to a corresponding value outcome of the reel-based game as shown in FIG. 2 and operates the reel-based game as described above and with respect to the figures. In one or more embodiments, when a player enters a wager on the base game and enters "PLAY" through an appropriate player control, a game play request may be transferred to central determination server 405 (discussed below in connection with FIG. 4) which may provide a single game outcome to the respective gaming machine 200. Game processor 301 may then initiate game presentations for the game concluding with outcomes corresponding to the game outcome provided by central determination server 405.

In one or more embodiments, coding may be implemented and stored in memory 303 and/or game 304, executable by game processor 301 to control game operation, display content, lighting, and audio through video, audio, reel drive motor controllers (for mechanical reels), and lighting controllers.

While the primary display has been depicted as displaying a set of reels, in one or more base game embodiments, the base game may comprise other types of games. For example, the base game may comprise a playing card-based game such as poker or blackjack, a dice-based game such as craps or a board game such as the Monopoly® game, a wheel-based game such as roulette or Wheel-of-Fortune® type prize wheel, or a competition-based game such as a car or horse race. Any of the types of primary game may include a trigger to initiate the feature game 101.

Also, while gaming machine 200 has been described as a stand-alone or networked game device, in one or more embodiments gaming machine 200 may be operable in a tournament or community gaming mode wherein players may compete for one or more awards or triggering of special features. For example, in one or more example configurations, one or more banks of gaming machines 200 may be networked to an overhead display which may display the feature game 101 and when triggered, the player triggering the feature game may be indicated on the overhead display as the feature game is played. In one or more embodiments, the participating players may be required to pay an additional fee to participate. For example, a network inquiry to play in the community game may be made on a player tracking display. If the player accepts the invitation for the community game, the player's account or gaming device credit meter may be debited accordingly. A community game controller may transmit a message to each participating player advising of their participation.

Figure 4:
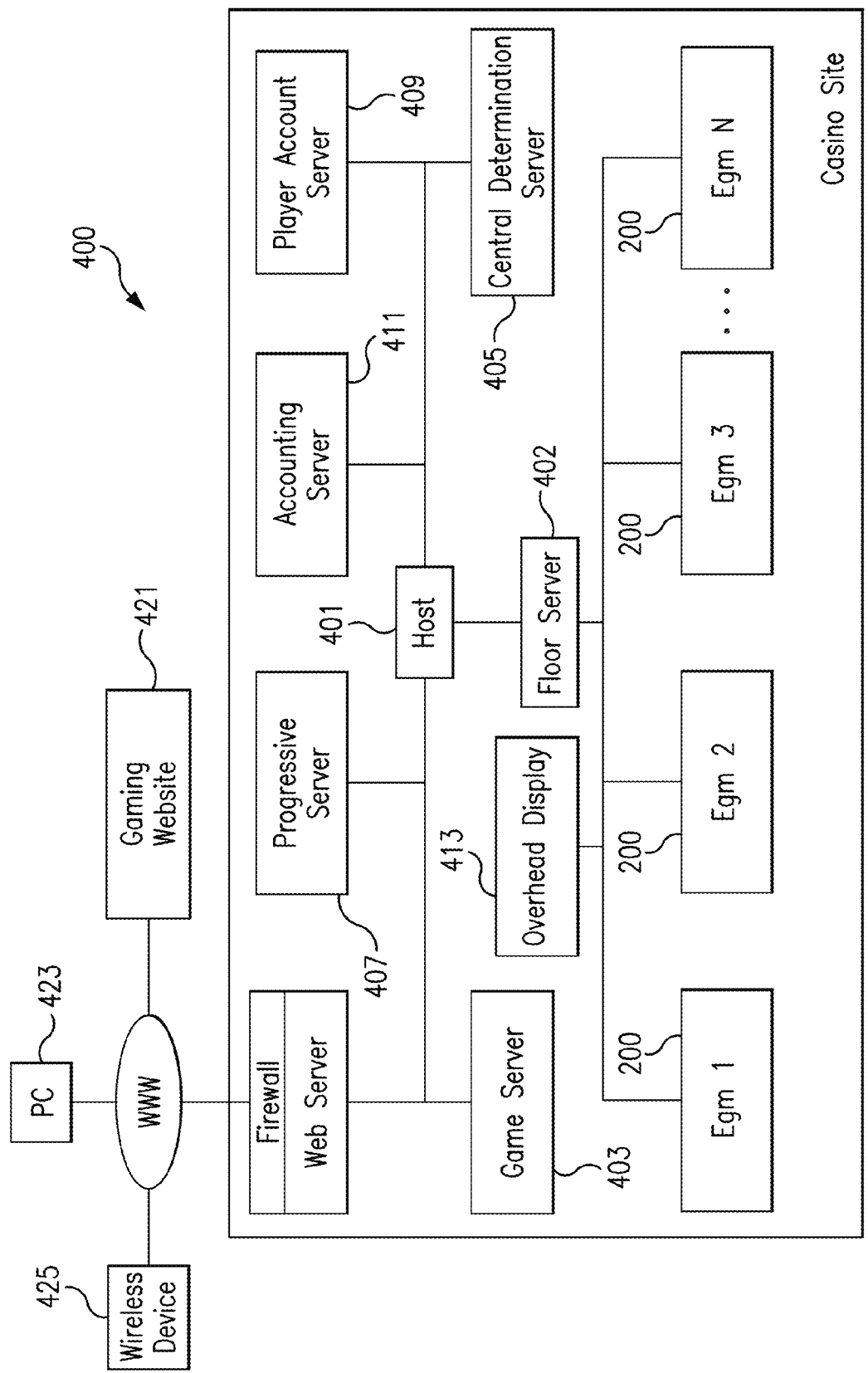
FIG. 4 is a diagrammatic representation of an example gaming network including one or more gaming machines with dual game play in accordance with one or more embodiments.

Referring to FIG. 4, a block diagram of example networked gaming system 400 associated with one or more gaming facilities is shown including one or more gaming machines 200 connected in a network with host server 401 and floor server 402. One or more of the gaming machines 200 may provide a base game and feature game as discussed above. While a few servers have been shown separately in FIG. 4, it will be appreciated that the servers may be combined or split into additional servers having additional capabilities.

As shown, networked gaming machines 200 (Egm 1-Egm N) and one or more overhead displays 413 may be network connected so as to enable the content of one or more displays of gaming machines 200 to be mirrored or replayed on overhead display 413. For example, the primary display content may be stored by the display controller or game processor 301 and transmitted through network controller 307 (FIG. 3) to the overhead display controller either substantially simultaneously or at a subsequent time according to either programming executed by game processor 301 (FIG. 3) or a triggering event, such as a jackpot or large win, at a respective gaming machine 200. In the event that gaming machines 200 have cameras installed, the respective players' video images may be displayed on overhead display 413 along with the content of the player's display 100 and any associated audio feed.

Game server 403 may provide server-based games and/or game services to network connected gaming devices, such as gaming machines 200 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event such as a progressive jackpot game outcome or other triggering event such as a random or pseudo-random win determination at a networked gaming device or server (to provide a large potential award to players playing the community feature game for example). Accounting server 411 may receive gaming data from each of the networked gaming devices, perform audit functions, and provide data for analysis programs, such as the IGT Mariposa™ program bundle. Central determination server 405 may be configured to determine lottery, bingo, or other centrally determined game outcomes and provide the information to networked gaming machines 200 providing lottery and bingo-based wagering games to patrons.

Player account server 409 may maintain player account records, and store persistent player data such as accumulated player points and/or player preferences such as game personalizing selections or options. For example, the player tracking display may be programmed to display a player menu that may include a choice of personalized gaming selections that may be applied to a gaming machine 200 being played by the player.

In one or more embodiments, the player menu may be programmed to display after a player inserts a player card into the card reader. When the card is inserted, an identification code may be read from the card and transmitted to player account server 409. Player account server 409 may then cause player information to be transmitted through network controller 307 (FIG. 3) for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 301 for storing and use during the player's game play. Also, the player's selection may be transmitted to player account server 409 where it may be stored in association with the player's account for transmission to the player in future gaming sessions. The player may change selections at any time using the player tracking display at the gaming machine (which may be touch sensitive or have player-selectable buttons associated with the various display selections).

In one or more embodiments, a gaming website 421 may be accessible to players to allow players to play one or more games as described herein through the use of personal computer 423 or handheld wireless device 425 (e.g. Blackberry® cell phone, Apple iPhone®, personal data assistant (PDA), iPad®, etc.). To enter the website, a player may log in with a user name (that may be associated with the player's account information stored on player account server 409 or be accessible by a casino operator to obtain player data and provide promotional offers). Once logged in, the player may play various games on the website. The play may also use the website to make various personalizing selections and save the information so that during a next gaming session at a casino establishment the player's playing data and personalized information may be associated with the player's account and accessible at the player's selected gaming machine 200.

Referring generally to the forgoing description and the following claims, as used herein the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "presentation" as used herein is meant to refer to the display of any image and/or video performance and/or the performance of one or more sound bites or audio tracks (such as digital or analog sound tracks or information stored on a memory device and processed by an audio controller to emit sound through a speaker) whether in an attract mode or as part of a game presentation or outcome.

The above described example embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for operating a feature game using a processor, the method including:
   receiving a player input from a card reader or bill acceptor/printer of a player tracking unit associated with a gaming machine, and in response activating player credits to be wagered;
   receiving a player game activation risking player credits in a wager;
   displaying a set of player selectable elements, each of the selectable elements corresponding to a respective award;
   displaying a sequence of prize levels;
   responsive to a player selection of one of the elements, uncovering an award associated with the element;
   increasing an achieved prize level from a first prize level to a second prize level based upon the award;
   replacing at least one of the respective awards with a terminator;
   shuffling the selectable elements;
   enabling a player to select again from the set of player selectable elements, and increasing the achieved prize level according to the award uncovered by each selection;
   terminating the feature game, when the player selects the terminator; and
   awarding an amount corresponding to the achieved prize level.

2. The method of claim 1, wherein the respective awards of the player selectable elements include awards of advancing one prize level, awards of advancing two prize levels, and awards of advancing three prize levels, all with respect to the displayed sequence of prize levels.

3. The method of claim 2, further comprising, after uncovering an award associated with the element and before shuffling the selectable elements, displaying awards associated with the other elements not selected by the player.

4. The method of claim 2, further comprising replacing at least one of the respective awards with a terminator after every selection made by the player, so that the number of terminators among the player selectable elements goes up after every selection made by the player.

5. The method of claim 2, in which the award replaced with a terminator is the highest value award remaining within the selectable elements.

6. The method of claim 1, in which the sequence of prize levels is displayed on a secondary display, and in which each prize level is presented as a different floor in a depiction of a multi-story building.

7. The method of claim 6, in which the selectable elements are depicted as elevator buttons.

8. A program product embodied in one or more tangible computer readable media, the program product including code executable by a gaming machine and at least one gaming server for:
   receiving a player input from a card reader or bill acceptor/printer of a player tracking unit associated with the gaming machine, and in response activating player credits to be wagered;
   receiving a player game activation risking player credits in a wager;
   providing a wagering game to a player, the wagering game having a possible feature game available as a bonus feature triggered in a base game, the feature game including:
   displaying a set of player selectable elements, each of the selectable elements corresponding to a respective award;
   displaying a sequence of prize levels;
   responsive to a player selection of one of the elements, uncovering an award associated with the element;
   increasing an achieved prize level from a first prize level to a second prize level based upon the award;
   replacing at least one of the respective awards with a terminator;
   shuffling the selectable elements;
   enabling a player to select again from the set of player selectable elements, and increasing the achieved prize level according to the award uncovered by each selection;
   terminating the feature game, when the player selects the terminator; and
   awarding an amount corresponding to the achieved prize level.

9. The program product of claim 8, wherein the respective awards of the player selectable elements include awards of advancing one prize level, awards of advancing two prize levels, and awards of advancing three prize levels, all with respect to the displayed sequence of prize levels.

10. The program product of claim 9, further comprising, after uncovering an award associated with the element and before shuffling the selectable elements, displaying awards associated with the other elements not selected by the player.

11. The program product of claim 9, further comprising replacing at least one of the respective awards with a terminator after every selection made by the player, so that the number of terminators among the player selectable elements goes up after every selection made by the player.

12. The program product of claim 9, in which the award replaced with a terminator is the highest value award remaining within the selectable elements.

13. The program product of claim 8, in which the sequence of prize levels is displayed on a secondary display, and in which each prize level is presented as a different floor in a depiction of a multi-story building.

14. The program product of claim 13, in which the selectable elements are depicted as elevator buttons.

* * * * *